Sept. 24, 1957     C. W. ROESCHKE     2,807,722
PULSE GENERATOR
Filed Jan. 17, 1955
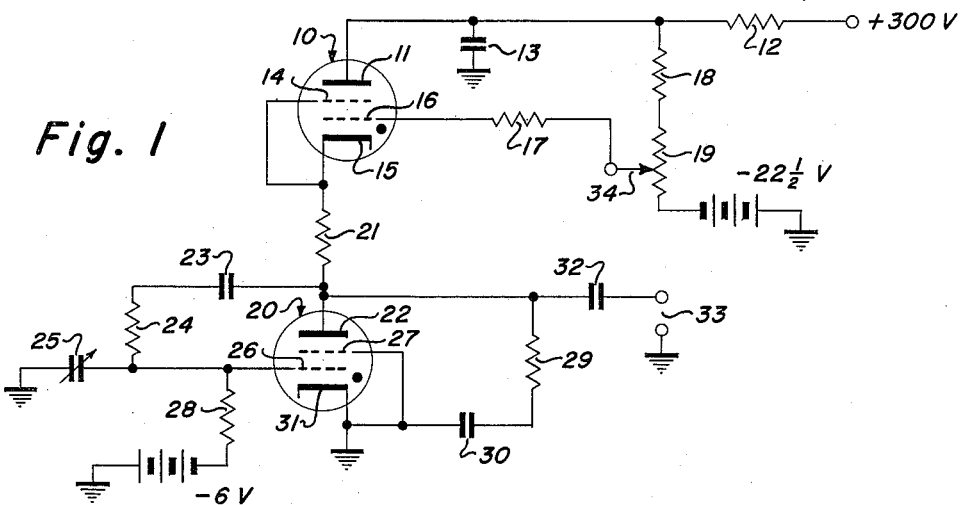
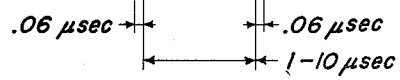
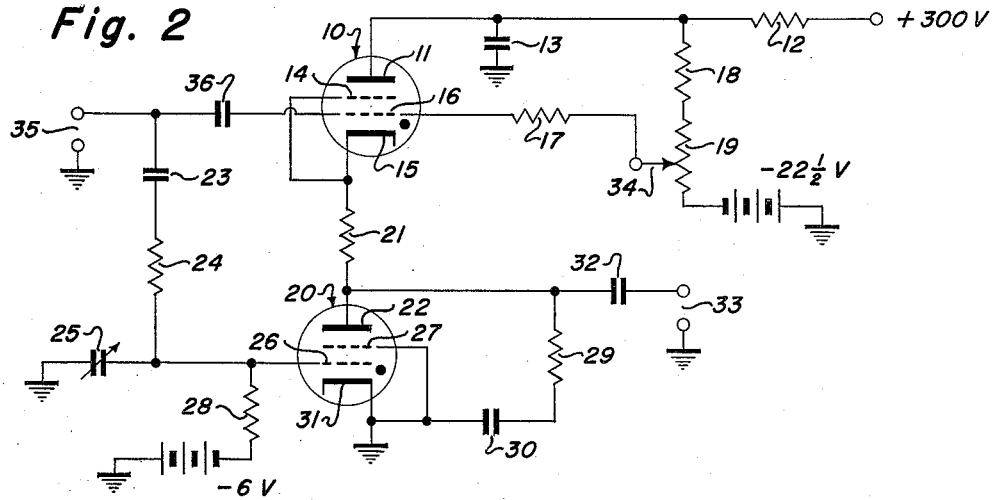
INVENTOR:
Conrad W. Roeschke
BY
Attorney

United States Patent Office 2,807,722
Patented Sept. 24, 1957

2,807,722

PULSE GENERATOR

Conrad W. Roeschke, Cedar Crest, N. Mex., assignor, by mesne assignments, to the United States of America as represented by the United States Atomic Energy Commission Application January 17, 1955, Serial No. 482,440

1 Claim. (Cl. 250—36)

This invention relates to an improvement in pulse generators by which there may be produced pulses of duration from about 1 to about 10 microseconds with truly flat top and extremely rapid rise and fall. The invention is of importance wherever such pulses are needed, for example, in telemetering and for repetitively controlling subsequent events.

The general object of the invention is thus to provide an improved pulse generator.

It will be clear from the description of the invention that the pulses may be produced either triggered by a separate input or as a free-running pulse generator.

Another object of the invention is therefore to provide a circuit capable of producing square-topped pulses of large amplitude and of controllable duration.

Another object is to produce as oscillator generating pulses of substantially rectangular shape.

These and other objects are attained by using the apparatus of the invention, as will be clear from the following description of an illustrative embodiment thereof read with reference to the accompanying drawing, in which:

Fig. 1 is a diagram of the circuit constituting an oscillator independent of other apparatus;

Fig. 2 is a diagram of the circuit arranged for triggering by an input pulse; and Fig. 3 shows the form of the pulses produced.

In all figures, like numerals designate like elements.

Referring first to Fig. 1, the free-running circuit includes two thyratrons designated 10 and 20, of which 10 may be called the instigating tube while tube 20 is the pulse producer. Both these thyratrons may be 2D21 or VC–1258, both of which types use cathode heaters. The former type permits the generation of 140-volt pulses while the latter may, with known changes in circuitry, enable the production of pulses of 240 volts with the same voltage on the anode of tube 10 in the two cases. In the figure, the use of 2D21-type thyratrons is contemplated.

Anode 11 of tube 10 is supplied with +300 volts by 51–K resistor 12, applied also to one terminal of condenser 13 of capacity 0.01 microfarad, the other terminal of which is grounded. Grid 14 is joined externally to cathode 15, while grid 16 is supplied through 47–K resistor 17 from a voltage divider 18—19 connected as shown between resistor 12 and a source of −22.5 volts.

Resistors 18 and 19 are of resistance 750–K and 1 megohm, respectively. It will be understood that the specific values above and later stated are appropriate to the embodiment of the invention chosen for illustration. Cathode heating power is understood but not shown.

When the operation of the circuit is started by the application of the voltages +300 and −22.5, grid 16 is biased negatively to cathode 15. Anode 11 assumes a low positive potential, and condenser 13 begins to charge. As the voltage on anode 11 and the charge on condenser 13 increase, the negative bias on grid 16 decreases. Eventually this action causes tube 10 to conduct, and condenser 13 discharges through tube 10 and elements to be later mentioned.

Cathode 15 is connected through 510-ohm resistor 21 to anode 22 of tube 20 so that when tube 10 conducts nearly the whole voltage applied to its anode appears at anode 22.

Anode 22 is connected through 0.001 microfarad condenser 23 to one terminal of 200–K resistor 24, the other terminal of which is connected to one terminal of variable condenser 25 (0–100 microfarads, for example), which is grounded at its other terminal. The junction of the last two elements is connected to grid 26 of tube 20, which is biased −6 volts to ground through resistor 28. Grid 27 is joined externally to cathode 31. If thyratrons of the type VC–1258 are used in place of 2D21's the negative grid biases of tubes 10 and 20 are omitted.

Anode 22 is connected in series with 1000-ohm resistor 29 and 0.001-microfarad condenser 30 to cathode 31 and is also, through 0.001-microfarad condenser 32, connected to output terminals 33. Cathode 31 is directly grounded.

The application to anode 22 of anode voltage when tube 10 conducts is immediate, and a positive voltage pulse appears at terminals 33. Experimentally, this pulse has been found to rise to a flat top of 140 volts in a time approximately 0.06 microsecond. This rapid rise is permitted by resistor 29, which prevents the voltage rise at anode 22 being slowed by the charging of condenser 30.

Neglecting the impedance of relatively large condenser 23, 200–K resistor 24 and variable condenser 25 constitute an integrating circuit, time constant (maximum) 20 microseconds. Applying the rising voltage at anode 22 to grid 26, the rise in voltage across condenser 25 eventually causes tube 20 to conduct. Condenser 30 discharges through resistance 29 and tube 20.

The discharge path of condenser 13, when tube 10 conducts, is through that tube, resistors 21 and 29 in series, and condenser 30 to ground. This discharge of condenser 13 into condenser 30 accompanies the application of voltage to anode 22 but is of no other effect than to prepare the circuit for its next operation. The time constant of this discharge is about 15 microseconds, thus setting an upper limit to the repetition rate of the oscillator, say 50,000 cycles per second. The one microsecond time constant of resistor 29 in series with condenser 30 imposes no limitation on repetition rate.

The rise time of the pulse at terminals 33 is determined by the resistance of tube 10 in series with resistor 21 and the distributed capacity between anode 22 and ground. The pulse decay time is determined by the resistance of tube 20 in series with the same distributed capacity. Both rise and fall are complete in about 0.06 microsecond, or less.

The pulse duration is varied by varying condenser 25 and is substantially independent of tube characteristics if the 300-volt supply is regulated. Resistor 21 isolates tubes 10 and 20 so that the output pulse at terminals 33 falls to zero even if the two thyratrons are still conducting.

Variable tap 34 on resistor 19 is used to select the appropriate negative bias for grid 16 of tube 10. As earlier stated, both the negative voltage sources applied respectively to grids 16 and 26 may be omitted when VC–1258 thyratrons are used.

With thyratrons of the 2D21 type, 140-volt pulses are obtained at terminals 33. The pulse becomes 240 volts with VC–1258 thyratrons. In each case the pulses are flat-topped with no overshoot. The pulse repetition rate is determined by the time constant of resistor 12 in series with condenser 13. This rate, with the values given, is of the order of 2,000 per second.

To place the pulse generator of Fig. 1 under control of input pulses derived from a separate source, the circuit is modified as shown in Fig. 2.

Condenser 23 is detached from its immediate connection to anode 22 and is now connected to the ungrounded one of input terminals 35. In series with this point and grid 16 is inserted another 0.001 microfarad condenser 36, serving as a stopping condenser between the external pulse source and grid 16. In this arrangement a representative voltage pulse applied to terminals 35 brings about conduction of tube 10 if it arrives at a moment in the charging of condenser 13 when its amplitude exceeds the negative bias on grid 16. The operation is repetitive if the duration of the input pulse is at least 0.5 microsecond and if the repetition rate of that pulse is compatible with that of the free-running circuit. The pulses produced at output terminals 33 are precisely the same in amplitude and shape in the triggered as in the free operation of the circuit.

It will be apparent that the principle of the invention may be embodied in circuits using other thyratrons than those illustrated in the foregoing description, making only changes which will be readily understood by those acquainted with the art to which the present invention relates.

I claim:

A pulse generating circuit capable of being triggered by an external source of voltage pulses comprising a first and a second thermionic tube having each a cathode, a control grid and an anode, a source of voltage having positive and negative terminals, the positive terminal of the source being connected to the anode of the first tube, while the negative terminal of the source is connected to ground and therewith to the cathode of the second tube, a resistance connecting the cathode of the first tube and the anode of the second tube, a first time-constant circuit included in the anode circuit of the first tube, means operative in each cycle for initially biasing the control grid of the first tube negatively to the cathode thereof, a second time-constant comprising a resistance in series with a condenser between the control grid of the first tube and that of the second tube and a variable condenser connected between the control grid of the second tube and ground, and means for applying voltage pulses from the external source in series with a condenser to the control grid of the first tube.

References Cited in the file of this patent
UNITED STATES PATENTS
2,467,415  Woodruff _____ Apr. 19, 1949